July 23, 1935. L. SANCHEZ-VELLO 2,009,326
MANUFACTURE OF GLASS TUBING AND CANE
Filed Dec. 23, 1931 6 Sheets-Sheet 1
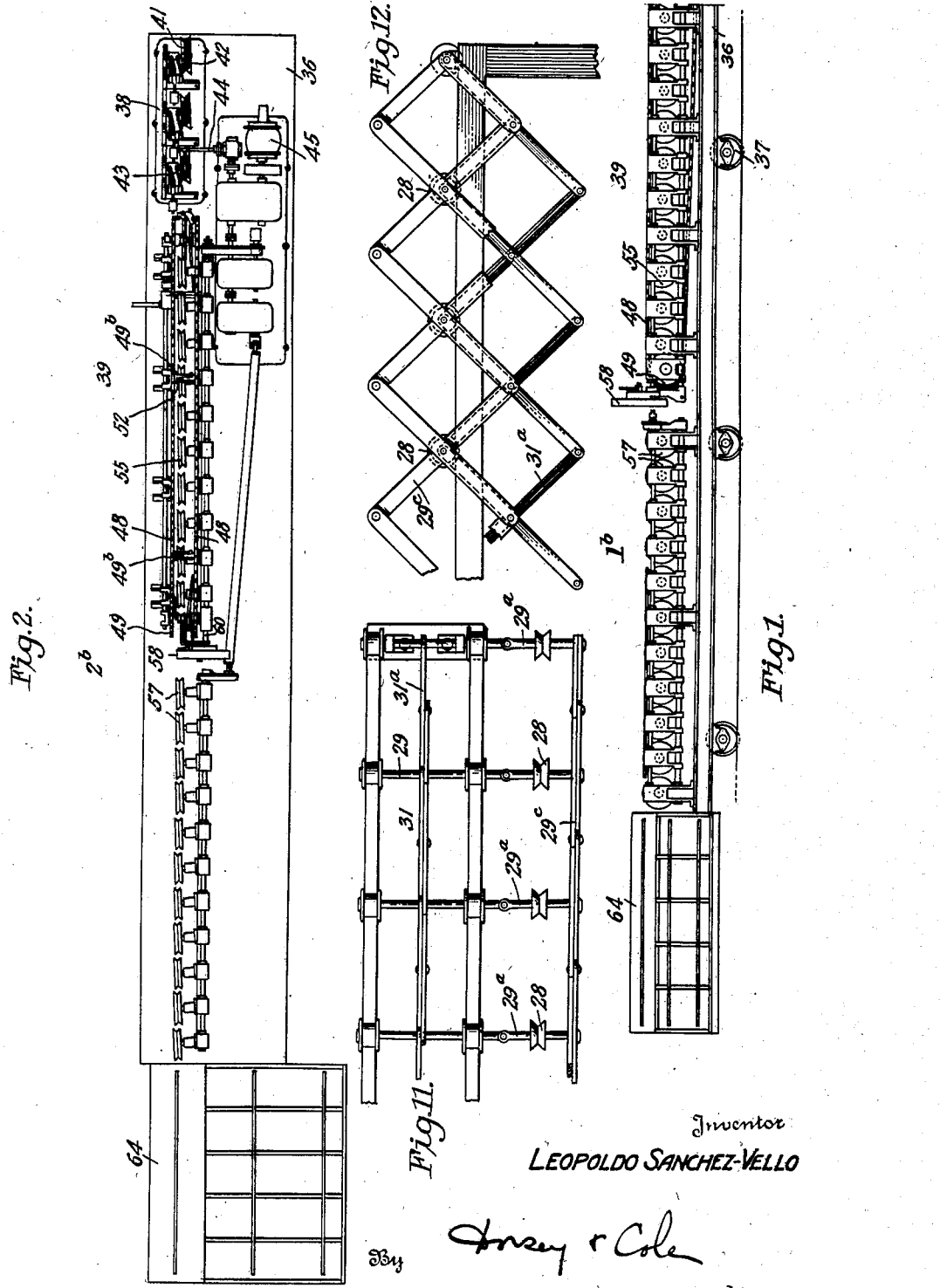
Inventor
LEOPOLDO SANCHEZ-VELLO
By Horsey & Cole
Attorneys

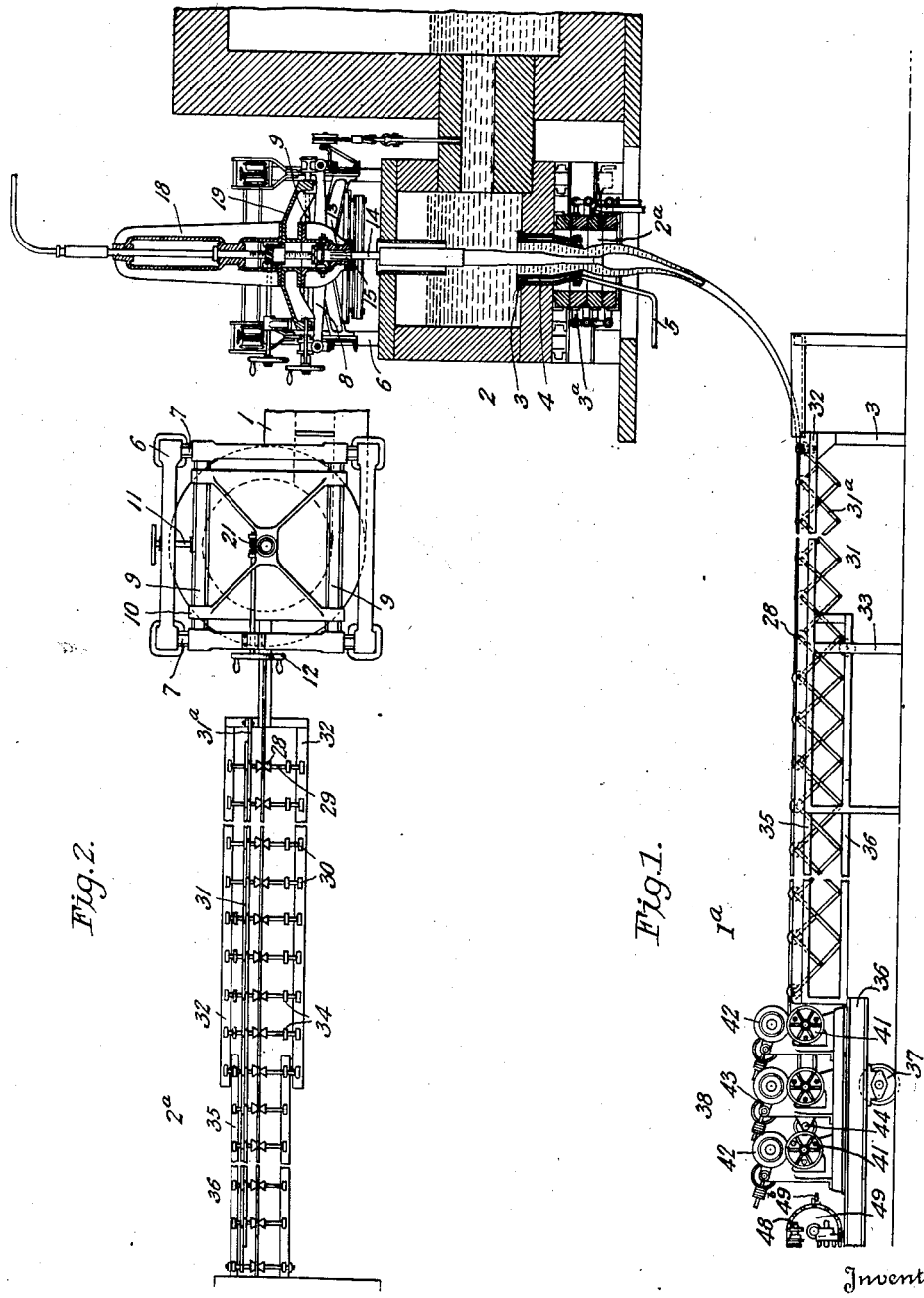

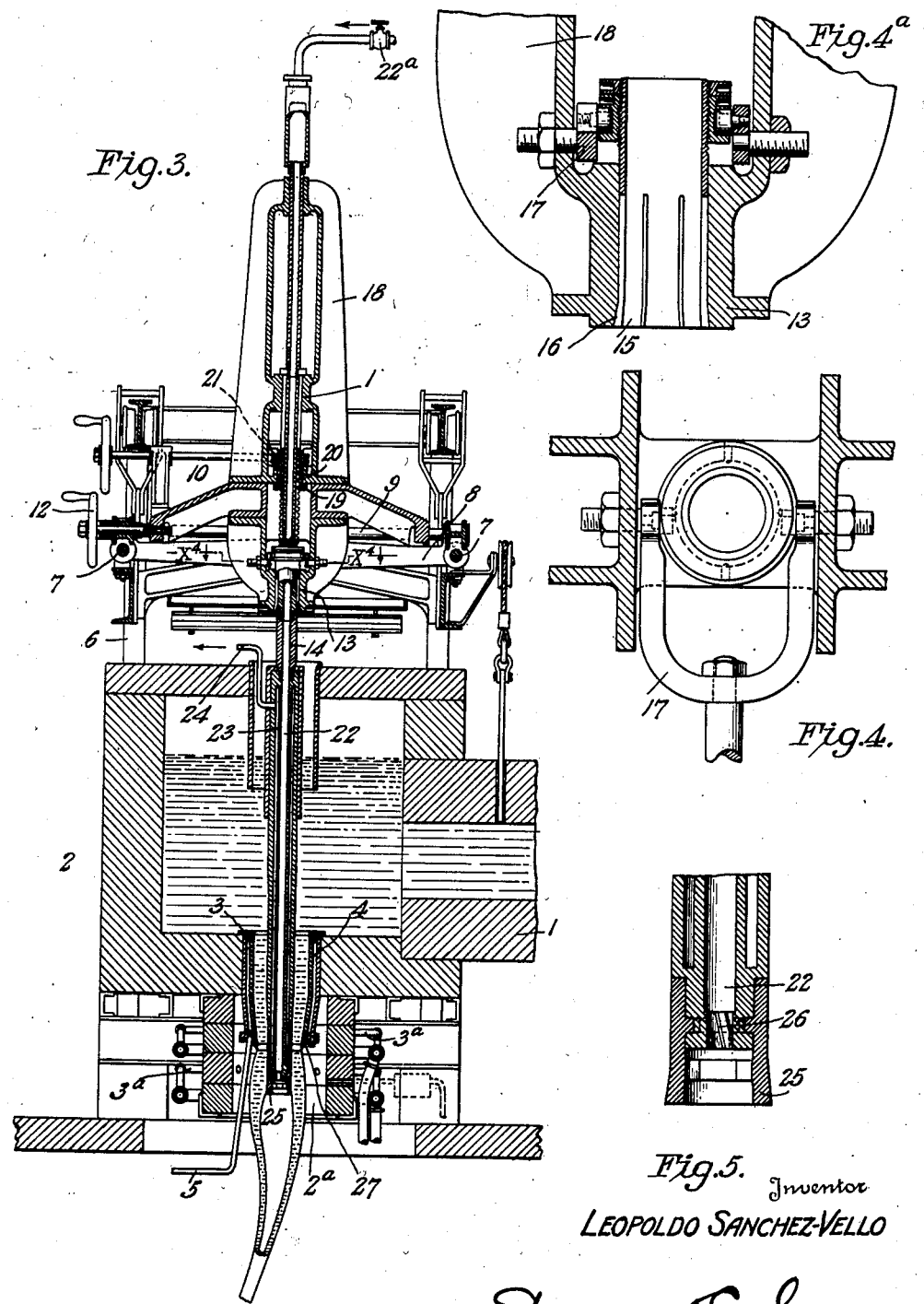

Inventor
LEOPOLDO SANCHEZ-VELLO

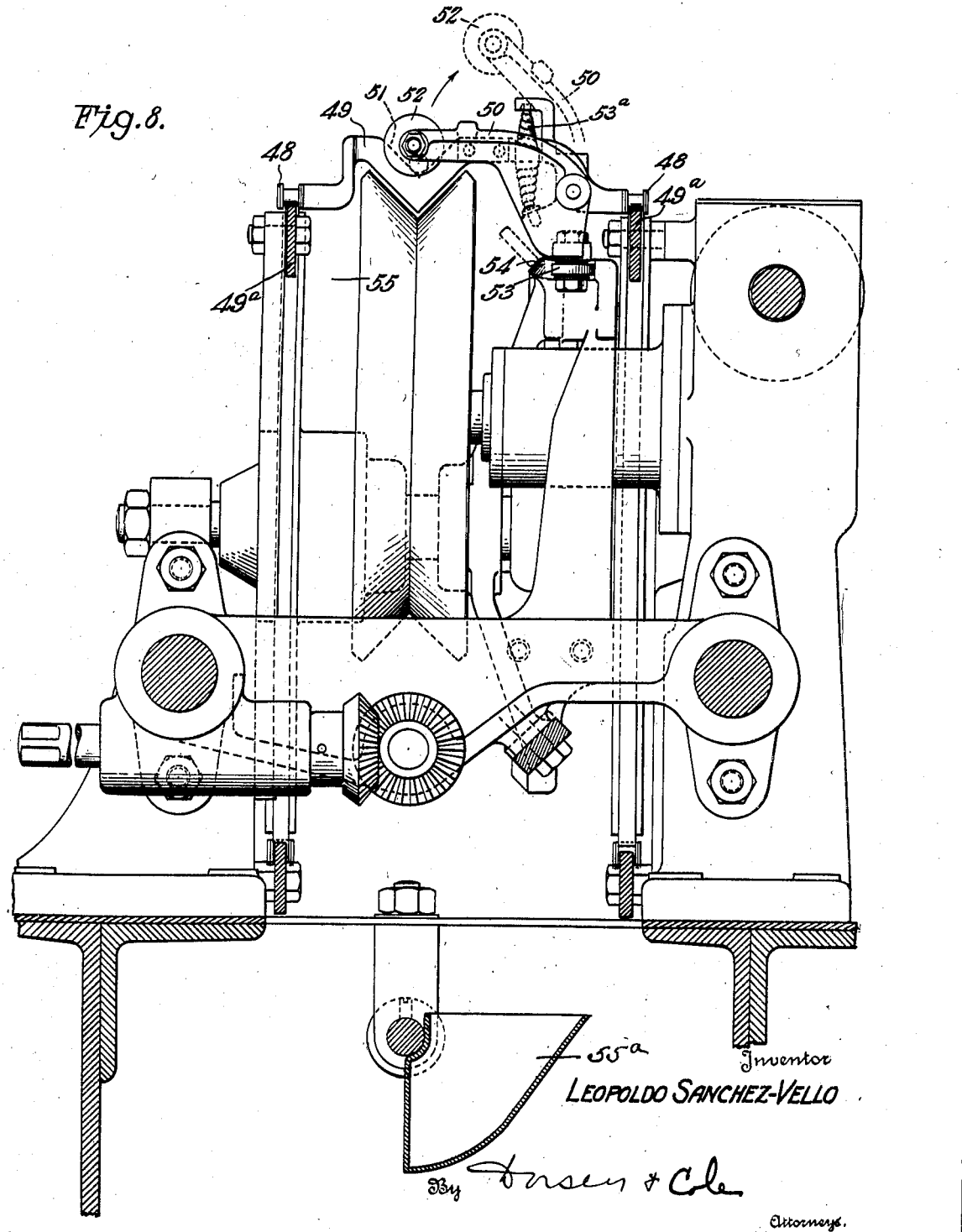

July 23, 1935.  L. SANCHEZ-VELLO  2,009,326
MANUFACTURE OF GLASS TUBING AND CANE
Filed Dec. 23, 1931   6 Sheets-Sheet 6
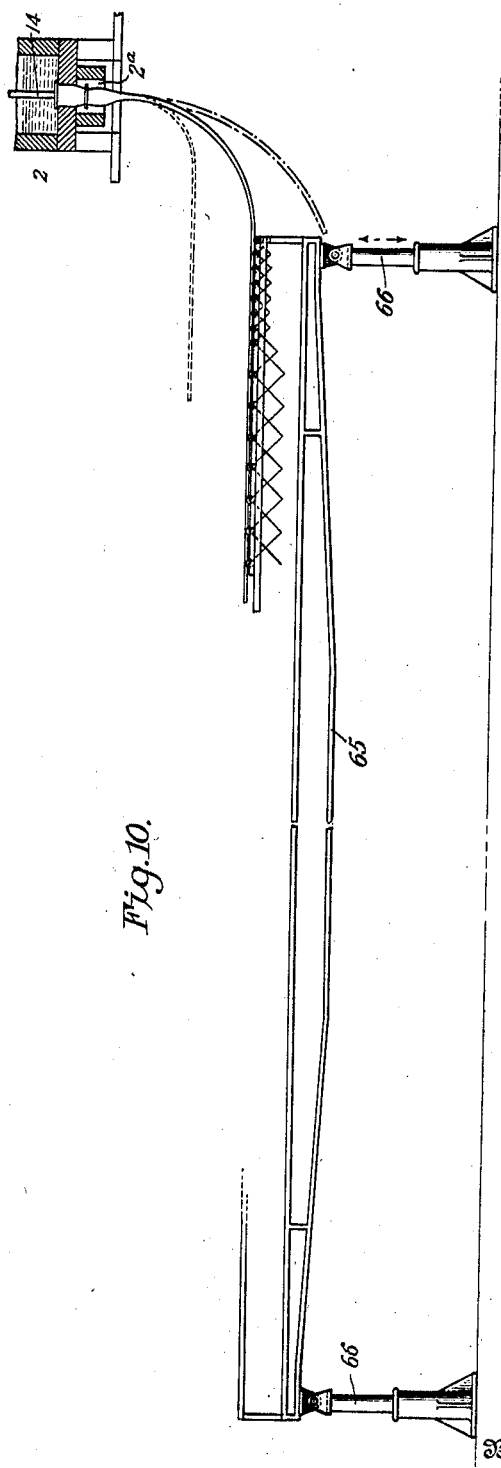
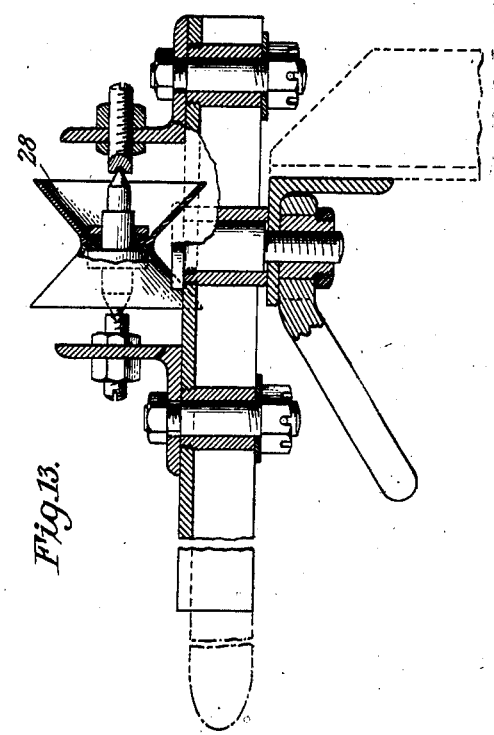
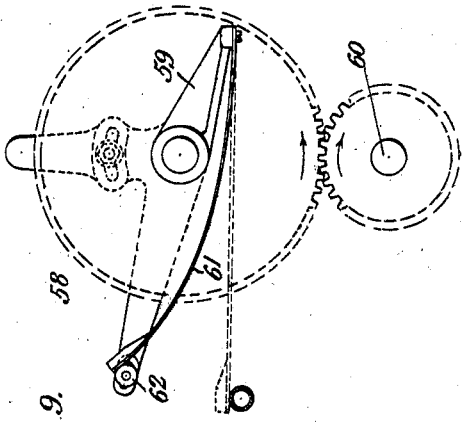
Inventor
LEOPOLDO SANCHEZ-VELLO Patented July 23, 1935

2,009,326

UNITED STATES PATENT OFFICE 2,009,326

MANUFACTURE OF GLASS TUBING AND CANE

Leopoldo Sanchez - Vello, Nogent - Sur - Marne, France, assignor to Maatschappij tot Beheer en Exploitatie Van Octrooien, The Hague, Netherlands Application December 23, 1931, Serial No. 582,860
In France January 26, 1931

34 Claims. (Cl. 49—17.1)

In my prior application, Serial No. 455,836, filed May 26, 1930, I have disclosed a method and apparatus for forming glass tubes by flowing the glass down through an annular outlet formed by an orifice in the floor of a glass container and a mandrel projecting through the orifice and on which latter the glass as it issues from the orifice forms a skin to be drawn off in the shape of tubing, air being introduced in the interior of the root of the tube as it is formed to cause rotation thereof.

In that application I further show means for drawing the tube horizontally and for rotating it while being so drawn, and for severing the tubing into lengths.

The present application is directed to the production of rods generally, i. e., cane as well as tubing, and includes much in common with the aforesaid application, and also certain features not disclosed therein. Among these features are:—

1. A glass contacting part or parts, specifically in the form of a mandrel and/or an outlet, of metal, and provided with means of applying a vacuum behind the glass contacting surface thereof to prevent air being drawn to the glass contacting surface and to thus prevent striations or bubbles in the glass.

2. An improved form of severing mechanism for the tubing or cane.

3. Varying the position of the severing point in respect to the point at which the tubing or cane is formed. This permits a control of the back pressure in the root of the tubing, and thus a control of the expansive action at that point without varying the amount of air introduced. It also permits, in the manufacture of both tubing and cane the selection of a point of severing at which the glass is at temperature proper for the severing action.

4. An extensible support for the tube in advance of the severing means to carry the tube and to permit the adjustment of the severing means.

Referring to the accompanying drawings in which corresponding parts are designated by corresponding marks of reference,—

Figure 1 is a side view, partly in section of a tube-drawing machine embodying my invention, this figure being divided into two parts, $1^a$ and $1^b$.

Figure 2 is a corresponding plan view of some of the mechanism shown in Figure 1.

Figure 3 is a vertical longitudinal section on an enlarged scale of the tube generating parts of Figure 1.

Figure 4 is a horizontal section on line $X^4$—$X^4$ of Figure 3.

Figure $4^a$ is a vertical sectional view of Figure 4.

Figure 5 is a vertical section through a modified form of mandrel provided with a vacuum chamber between its surface and its bore.

Figure 7:
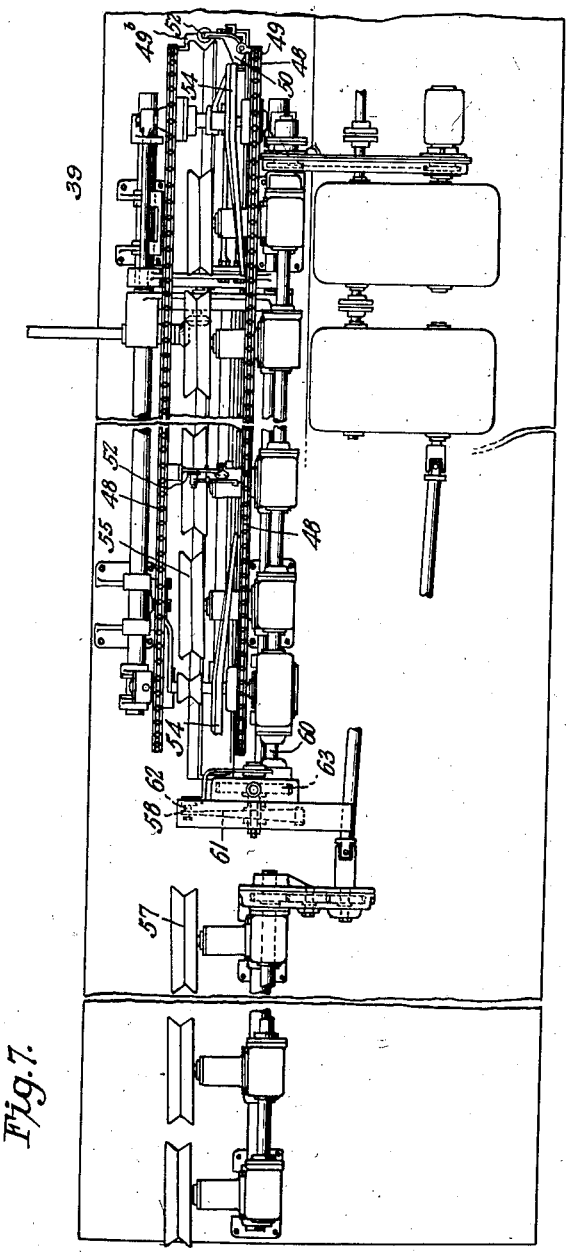
Figure 6:
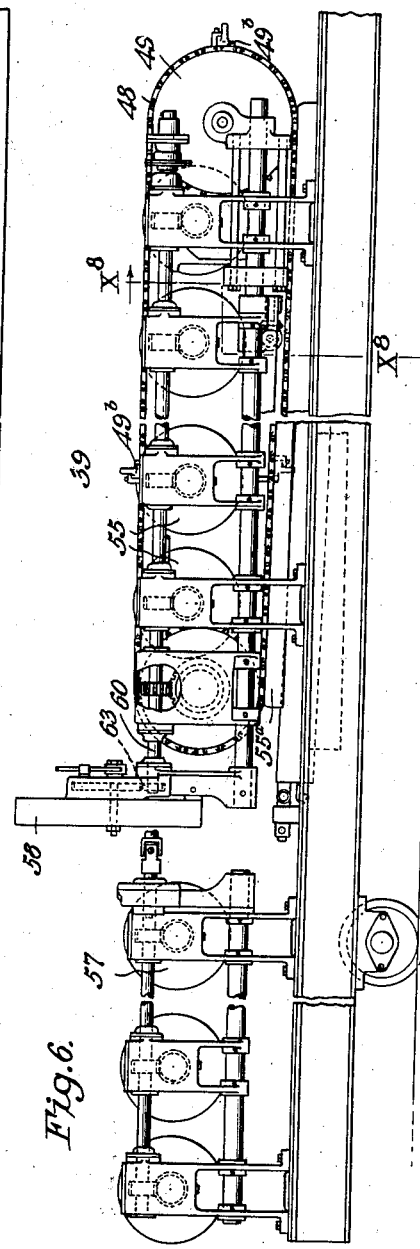

Figure 6 is an elevation, and Figure 7 a plan of the drawing and severing mechanism shown in a smaller scale in Figures 1 and 2.

Figure 8 is a vertical transverse section on line $X^8$—$X^8$ of Figure 6.

Figure 9 is a detail of the breaker mechanism.

Figure 10 is a view showing a vertically adjustable runway.

Figure 11 is a fragmental plan, and Figure 12 an elevation thereof showing means for varying the skew of the runway rollers.

Fig. 13 is a plan view partly in section showing means for mounting and simultaneously varying the skew of runway rollers which are not movable in respect to each other along the length of the tubing.

From a suitable melting furnace 1 projects the forehearth 2, the temperature in which may be controllably varied as is well known. The bottom of the forehearth has a removable orifice bushing 3 of a suitable metal which is covered by molten glass when the device is in operation. This bushing has an annular cavity 4 in its side walls, connected by the pipe 5 with a suitable source of vacuum. Thus the inner surface of the orifice, which is in contact with the glass, is surrounded by a vacuum chamber which not only intercepts the air in its passage through the bushing but draws occluded air in the metal into the chamber instead of permitting it to be drawn to the glass surface. The lower end of the bushing projects to below the floor of the forehearth and enters the upper part of a chamber $2^a$ having an open bottom, the temperature in which is controllable by means of burners $3^a$ directing flame around the glass issuing from the forehearth.

A frame 6, mounted above the forehearth, carries on horizontal rods 7 a carriage 8, which in turn carries on rods 9, at right angles to the rods 7, an upper carriage 10, the carriages sliding on their respective supporting rods, and being adjustable thereon by feed screws 11 and 12. The upper carriage supports from above the body 13 of the chuck for the mandrel 14, the lower portion of which latter projects through the orifice bushing. Thus by shifting the two carriages in their respective directions of travel, the mandrel may be given any desired selected position in respect to the axis of the orifice. To permit the mandrel to be firmly fastened in the chuck, the latter has a split collar 15 through which the mandrel passes, a bevelled surface 16 being formed on the exterior of the collar, so that when the latter is raised within the chuck body by the lever 17, it will firmly grasp the mandrel. This tightening of the chuck should, however not be done until the parts have all reached a stable temperature, and the mandrel has been adjusted to a proper vertical position.

The upper carriage also carries a head 18 for guiding the upper end of the mandrel, which is externally threaded, and passes through a worm nut 19 bearing against the upper edge of a flange 20 on the head. By turning the nut 19 by the worm 21 the vertical position of the lower end of the mandrel may be adjusted.

The mandrel 14 may be of metal, and when tubing is to be made is provided with a central longitudinal bore 22 through which air under pressure, determined by the valve 22ª may be passed. This bore may be omitted when cane is to be produced. I will in the following describe my invention as applied to the production of tubing, but it will be understood that with this change, what is said is applicable to the production of cane.

If desired the mandrel may have a chamber 23, surrounding the bore 22, and connected with a vacuum pipe 24, whereby the air under pressure in the bore 22, is prevented from passing through the metal to the glass contacting surface thereof.

The mandrel is shown as terminating at its lower end in a detachable tip 25, the diameter of which is suitable for the size of the tube to be formed.

As seen in Figure 5 the lower end of the bore 22 of the mandrel is rifled, being provided with helicoidal grooves 26, whereby a swirling motion is given to the air leaving it. The lower end of the orifice bushing also terminates in a removable ring 27 which also varies with the diameter of the tube to be drawn.

I have found that desirable results are obtainable by maintaining the glass in the forehearth at a temperature which is relatively low when compared with that which the prior art has suggested or tried for flowing glass rod through a submerged orifice and by maintaining a relatively rapid rate of flow through the orifice by having it unobstructed and of minimum resistance to flow and by maintaining a high head of glass over the orifice. This permits me to issue the glass at a rapid rate at the most desirable viscosity for drawing and permits the drawing to be done at high velocity. In operation the glass flows downwardly between the mandrel and the orifice and flows off the end of the latter in tubular form, with an internal diameter determined by the size of the mandrel tip. This diameter, which is greater than the diameter of the finished tubing, is then enlarged immediately below the mandrel by the compressed air entering through the axial bore of the latter, the pressure within the tubular form being due to the pressure at which the air is introduced and the rate of escape of such air through the hollow of the tubing, the latter rate varying with the length and bore of the tubing. At the same time the glass immediately below the mandrel (at the root of the tube) may be given a rotary motion by the rotation of the air due to the rifling of the bore. The enlargement of the tubular glass after passing through the orifice has a major influence on the wall thickness of the finished tube and the subsequent drawing has a major influence in fixing the diameter of the tubing as finished.

The tubing, after passing from the mandrel, moves downwardly and then under tractive force through a horizontal path, it being carried in this latter path on a runway formed by rollers 28 by which it is supported until it sets, it being reduced to the desired diameter by the tractive force. Each of these rollers is mounted on a shaft 29, having wheels 30 on its ends, the shafts forming the pivots of the upper abutting ends of the links 31ª of a pantograph 31, the centers of the intercepting links and the abutting lower end of the links being connected. For reasons hereinafter stated the length of the links increase as they are more remote from the vertical axis of the orifice.

The wheels 30 of the rollers which first receive the tube run on rails 32 carried by standards 33. The shafts 29 of the rollers 28 more remote from the vertical axis of the orifice, have in addition to the wheels 30, wheels 34, which run on rails 35 projecting from a carriage, 36, the tread of the rails 35 being different (shown as less than) from the rails 32 so that they telescope in respect thereto.

The carriage 36 is movable on its supporting wheels 37 along the path of movement of the tubing and carries at its front end the drawing mechanism 38 and in the rear thereof the severing mechanism 39 by which the tubing is separated into lengths.

The drawing mechanism includes a plurality of pairs of drawing rollers, each pair consisting of a lower grooved roller 41 and an upper roller 42, each upper roller being mounted on a counterbalanced radius arm 43, so that the upper rollers rest on the tubing running over the lower rollers with only sufficient weight to cause a drawing grip. The lower rollers are driven directly from a longitudinal worm-shaft 44 actuated with controllable speed from a motor 45 while the upper rollers are driven from the same shaft, the motion therefrom being transmitted through the pivots of the radius arms.

From the drawing mechanism the tubing passes to the severing mechanism 39, which comprises cutters, carried by two endless belts 48 passing over wheels 49 driven from the motor 45, one belt being one side of the vertical plane in which the tube is fed forward, the upper run of the belts moving in the direction of the feed of the tubing. The belts are supported between the wheels 49 by the tracks 49ª.

Each of the cutters comprises a bridge member 49ᵇ having its opposite ends fast on the opposite belts 48, and having pivoted therein an arm 50. Each bridge member has a V-shaped notch 51 in what is its upper surface in the upper run of the belts and in the vertical plane of the path of the tubing, and each arm carries a disc 52 on its one end to co-act with the notch in breaking the tubing, and a wheel 53 on its other end adapted to run on cam tracks 54 adjacent to the opposite ends of the upper run of the belt. The discs 52 are thrown against the notches by springs 53ª. The cutters on their lower run pass through a water trough 55ª, and on their upper run pass over a series of grooved driven wheels 55, the peripheral speed of which is slightly in excess of the speed of the movement of the cutters for purposes hereinafter stated. The spacing of the cutters is that of the length in which the tubing is to be cut.

In operation of the severing mechanism the tubing delivered thereto by the drawing mechanism is projected over the rollers 55. A cutter, with its arm 50 raised by the cam track 54 moves up on the ascending run of the belts and receives the tubing in its V-shaped notch, holding it up off the rollers. As the wheel 53 on the arm runs from off the front cam track 54 the disc 52 on the arm drops onto the tubing, breaking it, due to the chill of the parts and the heat of the tubing. The severed end or length of the tube, then falls on the rollers 55 by which, if the breaking has shortened it by shattering its ends, it is moved forward at a greater speed than the cutters, until its forward end abuts against the bridge member of the cutter in advance, thus positioning it for discharge onto the grooved rollers 57 of a take-off.

As under certain circumstances it may happen that the severing mechanism above described will not always break the tubing into lengths, I interpose between the severing mechanism and take-off mechanism a breaker 58 consisting of a hub 59 driven by the shaft 60 from the motor 45, the disc carrying a spring hammer arm 61 which, in the rotation of the disc, strikes and snaps past a stud 62 angularly adjustable around the center of rotation of the disc, and then strikes the tubing and breaks it unless it has already been severed by the severing mechanism. The timing of the passage of the hammer arm past the line of feed of the tubing is so adjusted that the arm either passes between the opposite ends of adjacent sections severed by the severing mechanism and separated by the greater speed of the rollers 57 over the speed at which the tube was drawn, or if the severing mechanism has failed to act, strikes the tube at the point weakened by the chill imparted thereto by the severing mechanism. To effect this timing a suitable phase change mechanism 63 is interposed between the motor 45 and hub 59.

The tube lengths separated as aforesaid pass, on to the take-off rollers 57 rotating at a higher speed than rollers 55 so that the sections are further separated on their passage thereover, and are projected onto the inclined table 64, the one after the other, down which they roll to be collected at the lower edge thereof.

For the purpose of insuring rotation of the tube until it is sufficiently hardened to prevent distortion and to insure that no part of the tubing is strained by prolonged contact with carrying surfaces, all of the rollers on which the tubing or tube lengths rest have tapered grooves in their periphery, the width of the grooves being greater than the diameter of the tubing, and all such rollers are skewed in respect to the line of feed of the tubing, that is to say, the axes of such rollers are inclined in horizontal plane to the vertical longitudinal plane in which is situated the axis of the tube passing over such rollers. The upper rollers 42 are also skewed but are skewed in the opposite direction.

From the above results that such of the lower rollers as are driven tend to cause a rotation of the tube as they feed the tubing forward, while such of the rollers as are not driven directly from the motor are driven with a minimum of effort from the tubing.

I prefer to arrange the rollers supporting and drawing the tubing on an incline, say of 3°. This reduces the strain on the tubing and may prevent its being pulled apart.

As stated, the links of the pantograph are shorter as they approach the axis of the orifice. This places the supporting rollers 28 closer together where the glass is hotter. It will be further seen that as the carriage 36 is moved back and forth along the runway for the tubing to select the desired point for severing it in accordance with the temperature of the glass, the diameter of the tubing and the pressure desired in the root of the tubing, the pantograph will be expanded or contracted, giving a continuous glass supporting surface in advance of the carriage. Thus the cut-off point may be gradually adjusted until the best results are obtained and without interrupting the continuity of the drawings. By this variation in the cut-off point I obtain a control which is in addition to that due to varying the air pressure, rate of draw and temperature, and having these variable conditions, variations in one or more of them may be compensated for by changes in the other or others, thus giving great flexibility.

The radius of the curve assumed by the tubing before being received by the runway is also of importance. A curve of too small radius results in deforming the tube in spite of its rotation from above and below while moving in the curved path, while if the curve is of great radius the vertical distance between the orifice and the runway may be so great that gravity pull on the glass at the orifice is excessive, or in itself sufficient to give the proper rate of draw. In the latter case no control can be had by varying the speed of the drawing mechanism. In certain circumstances therefore, I may, as shown in Figure 10, provide for raising and lowering the runway by mounting all parts thereof on girders 65 carried by extensible supports 66, pivoted to the girders so that the inclination of the runway may be varied as desired.

The lateral adjustment of the mandrel in the orifice is of great importance in maintaining uniform thickness of wall around the circumference of the tubing. Due to the horizontal drawing of the tubing and to other factors there is a tendency for one side wall of the tubing to be thicker than others when the mandrel is concentric with the orifice. By giving a selected eccentricity to the mandrel this may be overcome. As an instance, I note that a lateral displacement of the mandrel of six-tenths of a millimeter caused in one case a decrease in the thickness of the wall of the finished tubing along one side of twenty-five ten-thousandths of a millimeter. It is therefore desirable in displacing the mandrel to do so in successive steps of a selected amount, each calculated to produce a known change in wall thickness. In order to determine from an inspection of the lengths cut off from end of the tubing the direction in which the displacement should be made, I preferably made use of an implement 67 by which a spray of enamel may from time to time be projected onto the glass. The discoloration so produced on one side of the tube indicates the side of the tube being produced by the side of the mandrel opposite the implement.

It is often desirable to be able to vary the skew of the runway rollers and in Figs. 11 and 12 I have shown means by which this may be done. As there shown the shafts 29 have pivoted to swing in a horizontal plane on one end thereof the extensions 29ª on which the rollers 28 are mounted. The extensions 29ª may be shifted on their pivots to give the desired skew to the rollers and fastened at the selected point. In order to permit the simultaneous shift of all the rollers to an equal extent of the ends of the extensions 29ª are connected by a pantograph 29c, the ends of which are not fast to any fixed support. By shifting the pantograph 29c as a whole the rollers may be skewed while at the same time the pantograph permits the runway to be extended and contracted.

It will be apparent that many features of my invention are applicable alike to the manufacture of solid or hollow rod, although I have particularly described it with reference to the latter, which is commonly known as tubing. In the following claims I shall use the term "rod" as a generic expression embracing both cane and tubing and will in those claims restricted by their nature to the production of hollow cane use the term "tubing".

No claim is made herein to a process of suppressing air bubbles in glass moving from off a surface which comprises maintaining a subatmospheric pressure back of such surface or to a member over the surface of which glass is fed and having a chamber back of such surface with means for maintaining subatmospheric pressure in said chamber, as such matters are claimed in my application, Serial No. 697,351, filed November 9, 1933, as a division hereof.

Having thus described my invention what I claim is:—

1. The hereinbefore described method of forming glass tubing which comprises flowing the glass in tubular form through an orifice and around a mandrel, enlarging below the orifice the diameter of the tube so formed and drawing the enlarged glass to a diameter less than the diameter of the orifice.

2. That improvement in the art of drawing glass tubing from a submerged orifice which comprises issuing glass through an orifice and around a mandrel, swelling the resultant tubular glass below the outlet by internal air pressure and then reducing the tube by traction to a finished diameter less than the diameter of the orifice.

3. In a tube drawing machine the combination with a glass container having a submerged orifice, of a mandrel projecting through the orifice and around which the glass issues and from the lower end of which the glass flows in hollow form, means for enlarging below the orifice the bore of the glass and means for drawing the enlarged glass into a tube whose diameter is less than the diameter of the orifice.

4. In a tube drawing machine the combination with a glass container having a submerged orifice, of a mandrel projecting through the orifice and around which the glass issues and from the lower end of which the glass flows in hollow form, means for introducing air into the bore of the glass below the orifice to enlarge the same and means for drawing the enlarged body of glass into a tube whose diameter is less than the diameter of the orifice.

5. The hereinbefore described method of rotating a hollow glass body while expanding the same which comprises spirally introducing air into the interior thereof.

6. In an apparatus for the manufacture of glass tubing, the combination with a mandrel over which the glass moves and from which it is delivered, having a rifled bore, of means for passing air under pressure through the said bore.

7. The combination with a rod forming device, of a take-off mechanism for the rod comprising supporting rollers for the rod skewed in respect to the axis of the rod.

8. The combination with a rod forming device, of a take-off mechanism for the rod comprising undriven rollers supporting the rod and skewed in respect to the axis of the rod, and means for simultaneously and similarly varying the amount of skew of said rollers.

9. The combination with means for forming rod from molten glass, of a runway for the rod comprising a plurality of rollers having tapered grooves in the periphery thereof, of greater width than the diameter of the rod, the plane of rotation of the rollers being at an angle to the axis of the rod.

10. The combination with means for forming rod from molten glass, of a runway for the rod comprising a plurality of rollers having tapered grooves in the periphery thereof of greater width than the diameter of the rod, the plane of rotation of the rollers being at an angle to the axis of the rod, and means for rotating the rod.

11. The combination with means for forming rod from molten glass, of a runway for the rod comprising a plurality of rollers having tapered grooves in the periphery thereof of greater width than the diameter of the rod, the plane of rotation of the rollers being at an angle to the axis of the rod, and means for rotating certain of the rollers.

12. The combination in a rod machine, with a glass container having a downwardly directed orifice for the formation of the rod, of a severing mechanism for the rod movable towards and from the orifice, and an extensible runway between the orifice and the severing mechanism.

13. The combination in a rod machine, with a glass container having a downwardly directed orifice for formation of the rod, of a severing mechanism for the rod movable towards and from the orifice, a series of rollers forming a runway between the orifice and the severing mechanism and an extensible mounting for the rollers.

14. The combination in a rod machine, with a glass container having a downwardly directed orifice for the formation of the rod, of a severing mechanism for the rod movable towards and from the orifice, a series of rollers forming a runway for the rod between the orifice and the severing mechanism and a pantographic connection between the rollers.

15. The combination in a rod machine, with a glass container having a downwardly directed orifice for the formation of the rod, of a severing mechanism for the rod movable towards and from the orifice, a stationary track, a track movable with the severing mechanism telescoped therewith, and two series of rollers forming a runway between the orifice and the severing mechanism, the rollers of one series being supported from the stationary track and the rollers of the other series being supported from the other track, and a pantograph connecting the several rollers.

16. In a drawing mechanism for glass rod the combination of a roller having a tapered peripheral groove of greater width than the diameter of the rod, a disc mounted adjacent thereto to bear on the cane containing within the groove, the roller and disc being skewed in respect to the axis of the rod and in respect to each other, and means for driving the roller and disc.

17. In a mechanism for severing glass rod, the combination with means for continuously feeding the same, of an endless belt having a straight upper run and driven at substantially the speed of the feed of the rod, a member, having a notch in its upper surface, carried by the belt on its upper run along the path of the rod, an arm pivoted in said member carrying a disc registering with the notch, means for raising the arm as the member enters the upper run of the belt, and for thereafter lowering it, means for cooling the disc and a series of driven rollers located beneath the path of the rod.

18. In a mechanism for severing glass cane, the combination with means for continuously feeding the rod, of an endless belt having a straight upper run and driven at substantially the speed of the feed of the rod, a member having a notch in its upper surface carried by the belt on its upper run along the path of the rod, an arm pivoted in said member carrying a disc registering with the notch, means for raising the arm as the member enters the upper run of the belt, and for thereafter lowering it, means for cooling the disc, and a series of driven rollers located beneath the path of the cane, the peripheral speed of the rollers being greater than the speed of the belt.

19. The combination with means for continuously feeding glass rod, of a mechanism therefor to sever the rod into lengths, means for advancing the severed lengths at a speed greater than that of the speed of the rod, a hammer, means for periodically causing the hammer to move through the path of the said lengths.

20. The combination with means for continuously feeding glass rod, of a mechanism therefor to sever the rod into lengths, means for advancing the severed lengths at a speed greater than that of the speed of the rod, a hammer, means for periodically causing the hammer to move through the path of said lengths, and means for changing the phase relation between the severing mechanism and the hammer.

21. In a cane forming machine the combination with a container having an orifice from which the glass issues, of a runway comprising grooved rollers, shafts for the rollers pivoted in a vertical plane and a pantographic connection between the corresponding ends of the said shafts.

22. The method of rotating a cylindrical glass body while moving it axially, which comprises moving it axially over supporting rollers whose axes are inclined to the plane of movement of the body.

23. The method of compensating for variations in the temperature of a continuously formed glass rod at the point at which it is severed into separate lengths, which comprises changing the distance between the point of severance and the point at which the rod is formed.

24. The hereinbefore described method of forming and setting a continuous cylindrical glass body which comprises issuing the glass through a submerged discharge orifice without rotation in the orifice and imparting to the glass body, after its issue from the orifice and until it is severed into separate lengths, a rotation throughout its length.

25. The hereinbefore described method of controlling the size of glass rod, which comprises issuing the glass downwardly through an orifice in rod form, receiving the glass rod and transporting it axially on a substantially horizontal bed, and varying the vertical distance between the orifice and the bed in accordance with the size of the rod desired.

26. In a device of the character described, means for discharging molten glass downwardly in rod form, and a vertically adjustable substantially horizontal runway receiving the glass when formed.

27. In a device of the character described, means for discharging molten glass downwardly in rod form, a vertically adjustable substantially horizontal runway receiving the glass when formed, and traction mechanism to move the glass on the runway.

28. The hereinbefore described method of fabricating tubing from a bath of molten glass which comprises forming a tube by issuing the glass substantially vertically from a submerged orifice around a mandrel located eccentric to the orifice, bending the tube so that its axis is at an angle to the direction in which it issued from the orifice, and shifting the mandrel to a selected eccentric relation to the orifice to maintain a circular cross section of the tube after bending.

29. In a tube forming apparatus, the combination with a glass container having a submerged orifice, of a hollow mandrel mounted in the orifice and carrying an enlarged cone below and adjacent to the orifice, and spiral air ports in the cone discharging air into the interior of the hollow body produced by the cone.

30. In a tube forming apparatus, the combination with a glass container having a submerged orifice, of a hollow mandrel mounted in the orifice, the mandrel being eccentric to orifice, and means for horizontally carrying away the resulting tubing the amount of eccentricity being that necessary to compensate for uneven wall thickness otherwise resulting from the lateral draw of the tube.

31. In a tube forming apparatus, the combination with a glass container having a submerged orifice in the bottom thereof, of a hollow mandrel mounted in the orifice, means for giving the mandrel a selected eccentricity to the orifice, and means for carrying away the resulting tubing in a substantially horizontal direction the amount of eccentricity being that necessary to compensate for uneven wall thickness otherwise resulting from the lateral draw of the tube.

32. The hereinbefore described method of obtaining symmetrical wall thickness in tubing formed by issuing glass vertically down through a submerged orifice and around a mandrel, and by drawing the resulting tubing axially in a horizontal direction, which comprises adjusting the mandrel eccentrically in the orifice to compensate for the reduction in wall thickness due to the horizontal drawing.

33. The hereinbefore described method of continuous fabrication of tubing from a bath of molten glass, which comprises issuing the glass in tubular form through a vertical annular passage and applying rotative force to the tubular body hanging below the orifice by air jets directed into the interior of the body below the orifice.

34. In a device for drawing glass tubing, the combination with driven supporting rollers for the tubing, rotating in a plane parallel with the direction in which the tube is advanced, and other driven rollers bearing on the upper surface of the said tube, and rotating in a plane oblique to the lower rollers.

LEOPOLDO SANCHEZ-VELLO.